United States Patent [19]

Lutzow et al.

[11] Patent Number: 5,167,754
[45] Date of Patent: Dec. 1, 1992

[54] APPARATUS FOR PRODUCING LAYERED SHEET OF THERMOPLASTIC FIBER MATERIAL

[75] Inventors: Thomas H. Lutzow, Milwaukee; Lance Appleby, Pewaukee, both of Wis.

[73] Assignee: Matarah Industries, Inc., Milwaukee, Wis.

[21] Appl. No.: 520,678

[22] Filed: May 8, 1990

[51] Int. Cl.⁵ .............................................. B32B 31/00
[52] U.S. Cl. .................................... 156/549; 156/324;
156/548; 156/552; 156/554; 156/556; 156/558; 156/562; 242/75.5; 428/189
[58] Field of Search ............... 156/554, 324, 552, 548, 156/556, 558, 562, 549; 428/189; 242/75.5

[56] References Cited

U.S. PATENT DOCUMENTS 1,802,814  11/1928  Henderson ........................... 156/554
2,424,558  7/1947  Delano ................................ 156/555

FOREIGN PATENT DOCUMENTS

497788  12/1938  United Kingdom ................ 156/554

Primary Examiner—David A. Simmons
Assistant Examiner—Merrick Dixon
Attorney, Agent, or Firm—Nilles & Nilles

[57] ABSTRACT

A cohesive layered sheet of thermoplastic fiber material formed by two outer layers of material, each outer layer having a standard full width, and an inner layer made from strips of scrap material. The strips of scrap material each have a width substantially less than the standard full width and are arranged side-by-side so as to have a combined width approximately equal to a standard full width. The layers are ultrasonically bonded together so as to form a cohesive layered sheet. A method and apparatus are provided for manufacturing such a sheet.

9 Claims, 5 Drawing Sheets

APPARATUS FOR PRODUCING LAYERED SHEET OF THERMOPLASTIC FIBER MATERIAL

BACKGROUND OF THE INVENTION

1. Field of the Invention

This invention relates to a layered sheet, or laminate, of thermoplastic fiber material. The invention further relates to a method and apparatus for manufacturing a layered sheet whereby scrap rolls or trim rolls of thermoplastic fiber material, having very limited commercial value, are converted into a full width product which is very useful and commercially valuable.

BACKGROUND OF THE RELATED ART

Thermoplastic materials in the olefin family, such as polypropylene, polyethylene, polystyrene and the like, can be formed into very thin fibers which are entangled to form a thin, porous, nonwoven sheet of material. Several known processes are available for manufacturing such sheets of thermoplastic fiber material. One known process involves heating thermoplastic resin to its melting temperature, discharging the molten resin through very small orifices, and then agitating the still-soft fibers as by means of an airstream in order to entangle the fibers while they progress towards a surface against which the fibers come to rest in the form of a thin mat-like sheet. Material made from this particular known process is sometimes referred to as melt blown. Several other processes are also capable of making sheets of thermoplastic fiber material, and those processes and the materials produced by them are sometimes referred to as spin blown, spun bond and needle punch.

Thermoplastic fiber material made from these processes are used as air filters, filters for certain liquids, electrical insulation, thermal insulation in refrigerator cabinets and the like, and linings for cold-weather garments. Some forms of thermoplastic fiber material are able to adsorb oil, tend to repel water, and tend to float on water, and such forms are very useful for picking up oil spilled on a factory floor and for cleaning oil slicks off of water.

Sheets of thermoplastic fiber material are usually produced by a continuous process that provides a web of indefinite length having a uniform thickness and a fairly uniform width. In step with its production this web is wound onto a large roll, often called a parent roll or mill roll. Normally the web of the parent roll constitutes raw material which must be converted to commercially salable form.

In one particular converting process, two webs of thermoplastic fiber material are layered and bonded together to form a two-ply laminate. In this process, two full width rolls of full width material are arranged so that their axes are parallel to each other. The webs from the two rolls are unwound in a direction parallel to each other and the webs are oriented so that one web is placed directly on top of the other web. The two webs are then ultrasonically bonded together at a number of points along the width and length of the web, thus forming a cohesive two-ply sheet of material. After bonding, the material may be rewound, slit or cut as desired. The two-ply sheet produced in this known converting process has greater thickness, strength and commercial value than a single layer of the same material.

Often the width of the web of a parent roll is too large for the converting operation, so the parent roll must be trimmed to correspond to the width of the converting machinery. The desired web width for this particular known converting process is 72 inches, however, parent rolls are supplied from a manufacturer who produces parent rolls in web widths substantially in excess of 72 inches, usually 102 inches. The web width of the parent roll is therefore trimmed to the width desired for the converting process, in this particular case from 102 inches down to 72 inches, necessarily producing material having less than the desired width of 72 inches. Rolls having this less than desirable width are often called scrap rolls or trim rolls. Of course, the particular dimensions of the web width of a parent roll and of the desired web width for a converting process may vary.

The problem to which the present invention is directed has to do with the utilization of the scrap rolls, which are produced in quantities consistent with the demand for commercially desirable widths of material. Although the scrap rolls in this known case are typically in widths of 9, 12 or 18 inches, and can thus be regarded as having more or less standardized modular widths, there is little commercial demand for such narrow pieces of the material. Furthermore, supplying what demand there is for this narrow width material is actually uneconomical. The reason for this paradox is that the machines used for the lamination process, described above, are of course designed for the material having a full width of 72-inches; hence running such a machine with 9-, 12- or 18-inch material is obviously inefficient. On the basis of a unit of area, scrap-width material costs the processor more than equivalent material of the full 72-inch width but nevertheless tends to bring a lower price in the marketplace.

Some of the scrap material is cut across its width into very narrow (e.g., $\frac{1}{2}$ inch wide) strips, or particulate. This can be used as a sweeping material on oily floors or can be stuffed into mesh bags to provide so-called booms and socks that are employed for containing oil spills. However, the commercial demand for particulate material is also limited. In fact, combined sales of the scrap-width material and of particulate consume only a fraction of the total supply of scrap material that is constantly being generated, and therefore rolls of scrap material tend to accumulate in dead storage. Heretofore the usual practice has been to wait until the accumulation of scrap rolls grew to a certain size and then consign the whole lot to recycling, either through a junk dealer or directly. In recycling, the material was melted down and either reprocessed into melt blown or formed into some other thermoplastic product.

For many years it has been apparent that the cost of producing scrap-width material, per unit of area or of weight, was no less than the cost of producing commercial-width material. During all that time, when the scrap-width material brought, at best, a substantially lower price in the marketplace than the commercial width material, the low economic value of the scrap material effectively increased the cost of the commercial width material and/or ate into the profits of the converter who generated the scrap and had to dispose of it.

It is clear that there was strong incentive to find more economically advantageous uses for the scrap material, but it is equally clear that the nature of such a development was not obvious to those skilled in the art. Certainly it was not obvious to them—and, indeed, must have been inconceivable to them—that there might be a simple and efficient process which could so enhance the utility and value of the scrap material as to make it salable at the very same price per unit of weight or area as the wider commercially available material.

SUMMARY OF THE INVENTION

The general object of the present invention is to provide a simple and efficient process for converting thermoplastic fiber material that is in narrow scrap widths of low commercial value into a very useful and desirable product having the same utility and commercial value as the full width material. A more specific object of the invention is to provide a process whereby scrap widths of the above described thermoplastic fiber material are incorporated and essentially integrated into a layered laminate of material that is of full commercial width.

Another object of the invention is to produce a cohesive layered sheet of thermoplastic fiber material which utilizes scrap widths of such material to form at least one layer of a full width three-layer sheet.

Another object of the invention is to provide a method for utilizing scrap rolls of thermoplastic fiber material to produce a layered sheet.

Another object of the invention is to provide an apparatus which will perform the method of utilizing scrap rolls of material to produce a three-layer sheet.

DESCRIPTION OF THE PREFERRED EMBODIMENTS

The following detailed description of the preferred embodiments of the invention will describe, first, a three-layer laminate or sheet of thermoplastic fiber material having scrap widths of material to form at least one layer; second, a method of utilizing scrap rolls of material to manufacture the three-layer sheet; and finally, an apparatus for performing the method to produce a layered sheet.

Layered Sheet

Figure 3:
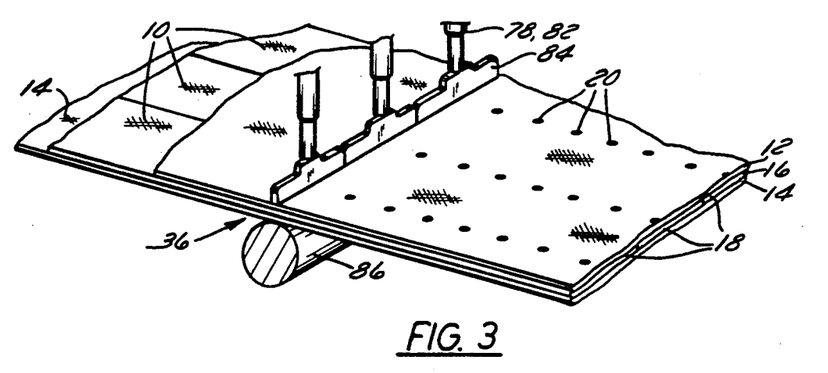
FIG. 3 shows a layered sheet of material having an inner layer, made from strips of scrap material, sandwiched and bonded between two full width outer layers of material.

A three-layer sheet 10 of thermoplastic fiber material is formed by two outer layers 12, 14 of material and an inner layer 16 sandwiched between the outer layers as shown in FIG. 3.

The inner layer 16 consists of scrap strips 18 of material which are layered side-by-side in parallel edge-to-edge relationship to each other. With reference to a converting operation which utilizes full width webs of 72 inches and has on hand scrap material of 18-, 12- and 9-inch widths, the inner layer 16 may be formed from either four strips of 18-inch wide strips; six strips of 12-inch width strips; eight strips of 9-inch wide strips; or any other combination of two or more scrap strips having a combined width of 72 inches.

Each of the two outer layers 12, 14 is a single-piece sheet of thermoplastic fiber material having a full width web of 72 inches. One outer layer 12 is in flatwise parallel contact with one side of the inner layer 16, and the other outer layer 14 is placed in flatwise parallel contact with the other side of the inner layer 16. The three layers are ultrasonically welded 20 together so as to form a three-ply sheet of material with a full width of 72 inches.

The weld bond 20 is approximately one-eighth inch in diameter and of such strength that, if the layers are pulled apart, the material surrounding the bond tears before the weld bond separates or breaks. Weld bonds 20 are made approximately 1 inch to 1½ inches apart from each other along the length and width of the sheet, and weld bond 20 uniformity is such that tear strength is generally uniform across the width and length of the sheet. The three-layer sheet 10 of thermoplastic fiber material described herein is 72 inches in width and up to ten thousand or more feet in length, but the sheets can obviously be cut to any desired length and width.

Method for Producing a Layered Sheet

Figure 6:
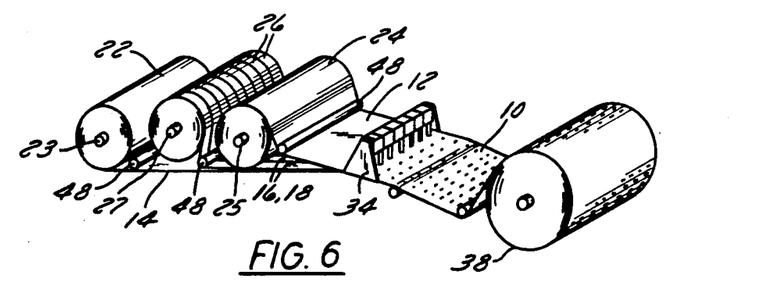
FIG. 6 is a perspective view depicting the practice of the method by which full width rolls and scrap rolls are converted into a layered laminate of material.

A layered sheet 10 of thermoplastic material as described above can be produced by a method as substantially shown in FIG. 6. A pair of full width rolls 22, 24 of thermoplastic fiber material having a full width web are mounted for rotation so that the rolls 22, 24 are in radially spaced apart relationship and have axes 23, 25 parallel to one another. The pair of full width rolls 22, 24 may be considered outer rolls since they correspond to the outer layers 12 and 14 described above. A plurality of scrap rolls 26 are mounted adjacently on a single axis 27 to provide for an inner roll 28 which is radially spaced apart from and substantially between the full width outer rolls 22, 24, and the axis 27 of the inner roll 28 is parallel to the axes 23, 25 of the outer rolls 22, 24. The scrap rolls 26 have a combined width approximately equal to the full width web of the outer rolls 22, 24.

From each of the outer rolls 22, 24 a sheet of full width material 12, 14 is withdrawn, and from each of the scrap rolls 26 a scrap strip 18 is withdrawn, all material being withdrawn at a substantially uniform rate. The scrap strips 18 from the scrap rolls 26 are withdrawn so that the scrap strips 18 are in parallel edge-to-edge relationship to form a layer 16 of material having a width approximately equal to the full width of the sheets 12, 14 withdrawn from the outer rolls 22, 24. The scrap strips 18 from the scrap rolls 26 and the full width sheets 12, 14 from the outer rolls 22, 24 are then brought into flatwise parallel relationship to each other such that the layer 16 formed by the scrap strips 18 is sandwiched between the two full width sheets 12, 14 from the outer rolls 22, 24.

The layers are then ultrasonically welded 20 at regular intervals across the length and width of the material to form the layers 12, 14, 16 into a cohesive three-layer sheet 10 which may then be rewound or otherwise processed.

Apparatus for Producing a Layered Sheet

Figure 1:
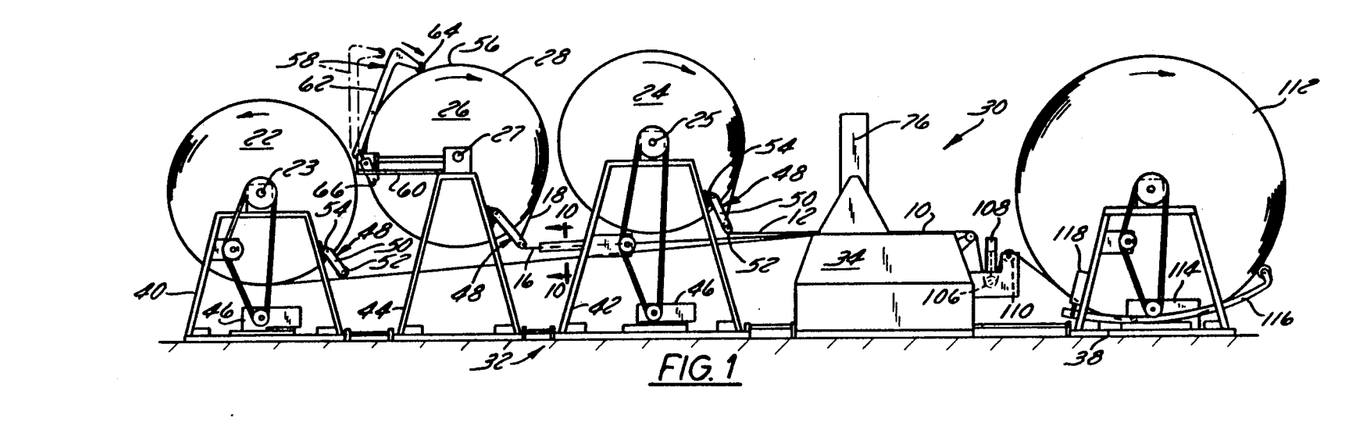
FIG. 1 is a side view of an apparatus for converting two full width rolls and a plurality of scrap rolls of thermoplastic fiber material into a layered sheet.
Figure 2:
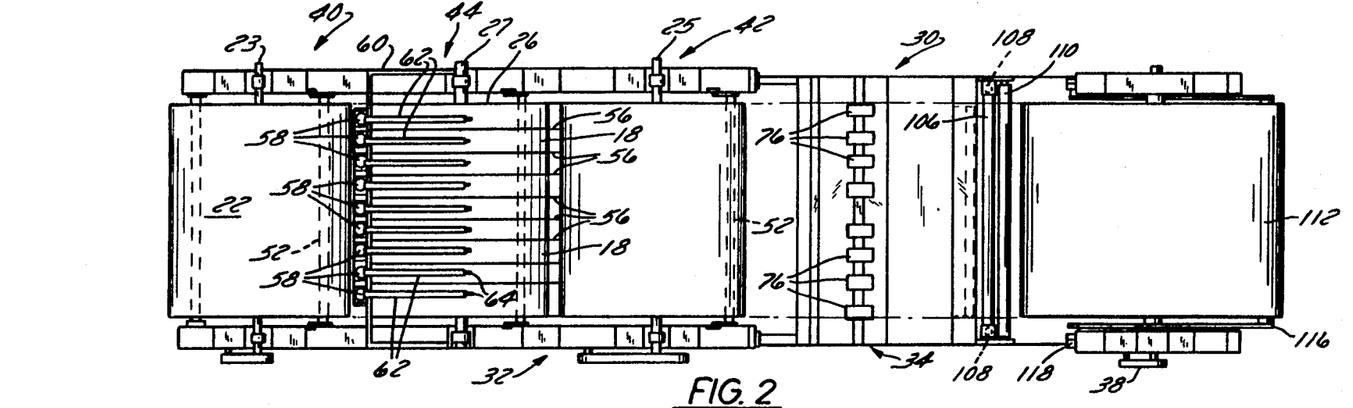
FIG. 2 is a top view of the apparatus shown in FIG. 1.

The apparatus 30 for performing the method which utilizes scrap rolls 26 of thermoplastic fiber material to produce a layered sheet 10 has at least an unwind station 32 for unwinding rolls 22, 24, 28 of material into layers 12, 14, 16 and a welding station 34 for bonding 20 the layers together. The apparatus may optionally have a scoring station 36, cutting station, or a rewind station 38 for further processing the sheet.

The unwind station has at least three feed reel assemblies 40, 42, 44. Two feed reel assemblies 40, 42 are for unwinding full width rolls of material 22, 24 and the third assembly 44 is for unwinding a plurality of scrap rolls 26. The first feed reel assembly 40 operates in counterclockwise rotation (from the point of view shown in FIG. 1) and the second feed reel assembly 42 operates in clockwise rotation, but otherwise the two assemblies 40, 42 have essentially the same construction.

The two feed reel assemblies 40, 42 for unwinding the full width rolls 22, 24 are motor driven 46. On each of these two feed reel assemblies 22, 24 a dancer assembly 48 controls the motor 46 to drive rotation of the full width roll 22, 24. The dancer assembly 48 has a pivot arm 50 connected to one side of the assembly, a second pivot arm 50 connected to the other side of the assembly 40, 42, and a shaft 52 between the two pivot arms. The web of material from the roll 12, 14 is fed across the shaft 52 of the dancer assembly 48, and tension in the material causes the pivot arms 50 to pivot up or down. A potentiometer 54 connected to the pivot arms 50 controls the motor 46. The dancer assembly 48 is adjusted so that the full width roll 22, 24 will unwind at a speed which will result in as little slack as possible in the material 12, 14 as the material travels through the machine. If the material being unwound from the roll is too tight, the potentiometer 54 on the dancer assembly 48 causes the motor 46 to increase the unwind speed of the roll 22, 24 and thereby reduces the tension in the material. If, on the other hand, the material has too much slack, the potentiometer 54 on the dancer assembly 48 causes the motor 46 to slow down or pull back slightly to pull the slack out of the web. The motors 46 for unwinding full width rolls 22, 24 are direct current, and are rated at one horsepower, 180 volt, 5 amps, and 1750 rpms. The motors employed in this particular embodiment are Baldor Industrial motors available from Baldor Electric.

The two feed reel assemblies 40, 42 for unwinding the full width rolls 22, 24 also have tracking rolls, which are pivotable on one side of the feed reel assembly and manually adjustable at the other side, to control the tracking or path of the web of material as it travels from the unwind station 32 to the ultrasonic welding station 34.

The third feed reel assembly 44 of the unwind station 32 is located substantially between the other two assemblies 40, 42 so that as the scrap rolls 26 on the third assembly 44 are unwound, strips of material 18 from the scrap rolls 26 are sandwiched between the full width webs 12, 14. The third feed reel assembly 44 is undriven.

The third feed reel assembly 44 is capable of handling two up to nine scrap rolls 26 having a combined width approximately equal to a full width roll of material 22, 24. With reference again to the converting operation utilizing full width rolls of 72 inches, the third feed reel assembly 44 can be loaded with either four rolls of 18 inch wide scrap rolls, six rolls of 12 inch wide scrap rolls, eight rolls of 9-inch wide scrap rolls, or indeed any combination of scrap rolls having widths totaling 72 inches. The scrap rolls 26 are placed on a single shaft 27, so the scrap rolls 26 are coaxial. A spacer 56 placed between every pair of scrap rolls 26 allows each scrap roll 26 to rotate without interference from an adjacent scrap roll 26. A spacer 56 is simply a large metal disc, akin to an oversize washer, placed on the shaft 27 between each pair of scrap rolls 26. The shaft 27 is loaded first with a scrap roll 26, then a spacer 56, then a second scrap roll 26, then a second spacer 56, and so on, until the shaft is fully loaded. All of the scrap rolls 26 are placed on the shaft 27 so that, as they are unwound, the scrap roll 26 rotate in the same direction.

The material unwound from the full width rolls 22, 24 and from the scrap rolls 26 travels from the unwind station 32 to the ultrasonic station 34 at the same linear speed. The scrap rolls 26 rotate independently from each other and each scrap roll 26 may rotate at a slightly different number of revolutions per minute than the others. Each scrap rolls 26 is therefore provided with an independent tension arm assembly 58, which is mounted on a support frame 60 attached to the third feed reel assembly 44. The tension arm assemblies 58 are easily removable and adjustable across the width of the third feed reel assembly 44 so that any one tension arm assembly 58 may be placed in proper position to correspond with a scrap roll 26.

Figures 7, 8, 9, 10:
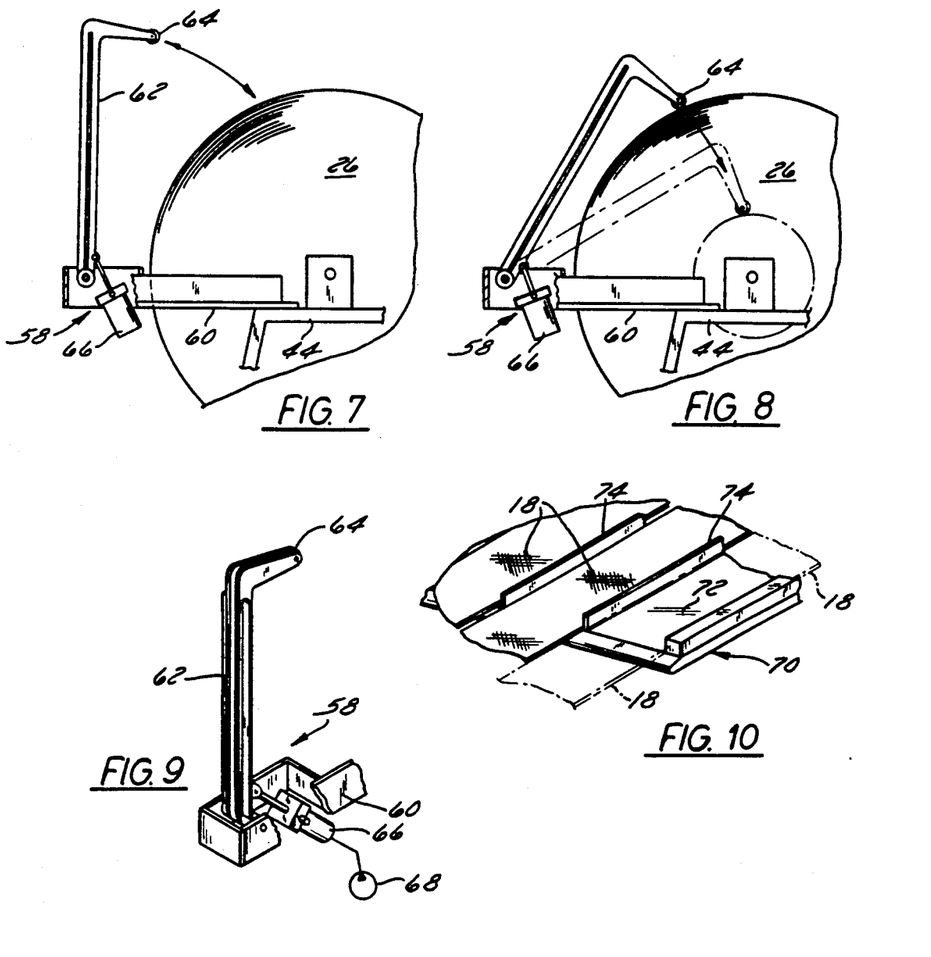
FIG. 7 shows a tension arm assembly in the raised position.
FIG. 8 shows a tension arm assembly in the lowered position whereby it acts to retard or restrain the scrap roll as material is unwound from it.
FIG. 9 is a detailed view of a tension arm assembly.
FIG. 10 is a detailed view of a tracking section for maintaining proper alignment of the scrap strips during the process of making the layered sheet.

Each tension arm assembly 58 has a tension arm 62 which is pivotable onto and away from its corresponding scrap roll 26. The tension arm 62 contacts the scrap roll 26 with a plastic split roller 64 which freely rotates as the scrap roll 26 rotates. A diaphragm air cylinder 66, pneumatically powered from a main air supply 68, pivots the tension arm 62 from a raised position, down onto the scrap roll 26 when the machine 30 is started, and maintains a pressure on the tension arm 62 so that it acts against the scrap roll 26 and slightly retards rotation of the scrap roll 26 to prevent slack. A regulator 67 maintains the proper air pressure to the air cylinders 66, which therefore maintains the proper force acting on the scrap rolls 26. When the machine 30 stops, the air cylinder 66 pivots the tension arm 62 back into the raised position where it has no contact with the scrap roll 26. Test runs of a machine having the embodiment described herein have shown that the tension arms 62 may not have to contact the scrap rolls 26 under all circumstances. It has been found that the narrower scrap rolls (e.g. 9-inch wide rolls) operate satisfactorily without the additional friction from the tension arm assemblies 58, but it is expected that the(wider scrap rolls will need the additional friction.

Strips of material 18 unwound from the scrap rolls 26 slide across a tracking section 70 which has a tracking surface 72 and tracking spacers 74 to maintain the strips 18 in parallel edge-to-edge relationship so as to form a layer 16 and to keep the strips 18 in proper alignment as they are sandwiched between the two outer layers 12, 14 of full width material.

Figure 4:
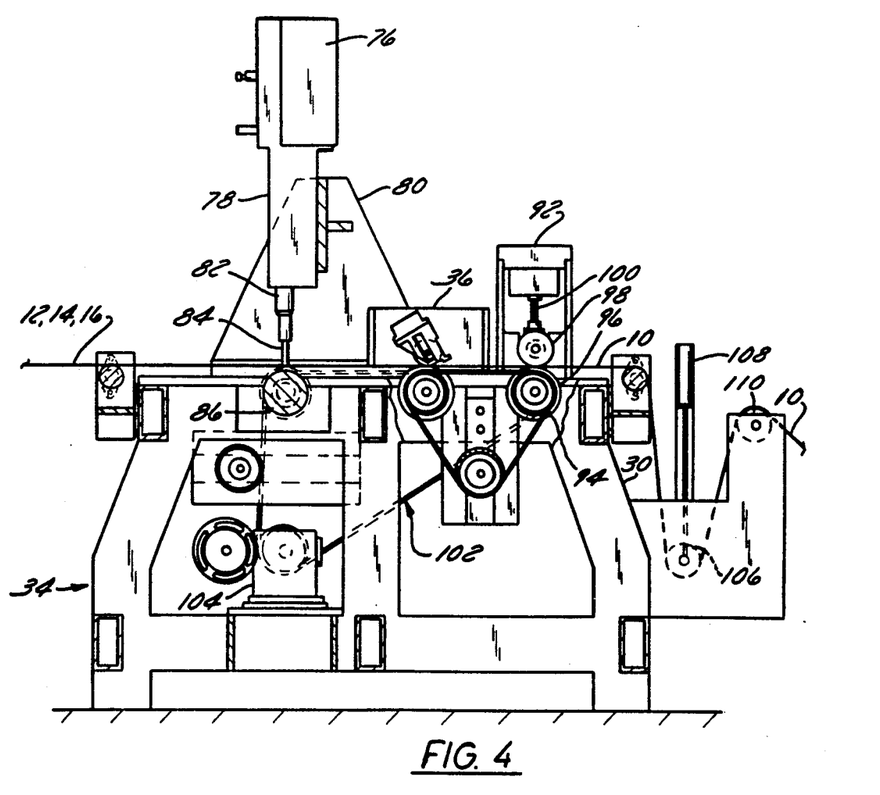
FIG. 4 is a detailed side view of a welding station where the layered sheet of material is ultrasonically bonded together.
Figure 5:
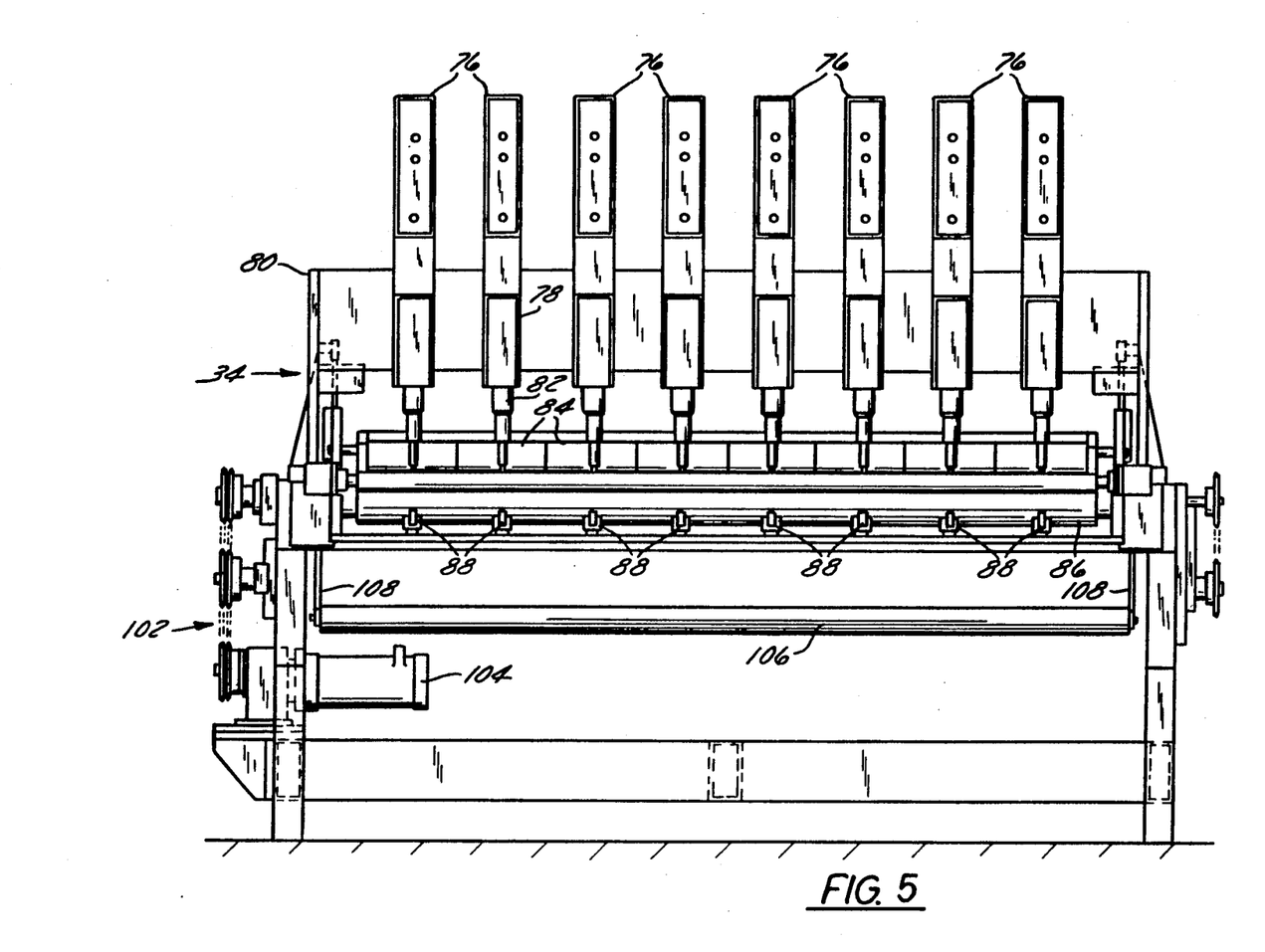
FIG. 5 is a front detailed view of the welding station.

The welding station 34 is where the layers 12, 14, 16 of material are ultrasonically welded together by ultrasonic welders 76. In ultrasonic welding, high frequency sound energy is used to bring the separate layers 12, 14, 16 of thermoplastic fiber material to a molten state to permanently bond the layers together. During ultrasonic welding, high frequency electrical energy is converted into mechanical vibratory energy, which causes the layers 12, 14, 16 of thermoplastic fiber material to vibrate against each other. The mechanical vibration causes frictional heat which melts the material and fuses the layers 12, 14, 16 together at 20.

In this particular embodiment, eight ultrasonic welders 76 are placed in a row across the width of the machine 30. Each ultrasonic welder 76 has an actuator 78 supported on a frame 80 over the web material 10, 12, 14, 16. Each actuator 78 has an air cylinder 82 which extends an ultrasonic horn 84 downward on top of the material 10, 12, 14, 16 passing through the welding station 34. Beneath the material 10, 12, 14, 16, aligned directly underneath the actuators 78, is a rotating anvil 86 which lies across the width of the welding station 34. Bearing assemblies 88 are placed beneath the anvil 86, one assembly 88 beneath each actuator 78, to provide support and prevent deflection of the anvil 86 when it is being acted upon by the actuators 78 and horns 84.

The ultrasonic welders 76 in this particular embodiment are Branson Series 900 available from Branson Ultrasonics Corporation, and each welder is independently controlled by a programmable numeric controller 79. A gap is set between the horns 84 and the anvil 86 for the material 10, 12, 14, 16 to pass through. The gap is just wide enough to allow the three layers 12, 14, 16 of material to pass through, and if material jams up as it is fed through the gap, the air cylinders 82 allow the horns 84 to deflect slightly in an up and down direction. When the machine is not operating, the cylinders 82 retract the horns 84 away from the material.

A drive assembly 92 pulls the material 10, 12, 14, 16 through the welding station 34. The drive assembly 92 consists of a drive roll 94 which lies across the width of the machine 30, located beneath the material 10. The drive roll 94 has rubber 0-rings 96 at small intervals across its length for grabbing the material 10 to pull it through the welding station 34. Directly above the drive roll 94 is a nip roll 98 which is pressed in the direction of the drive roll 94 by air cylinders 100. The drive roll 94 is attached by a sprocket and a chain assembly 102 to a direct current motor 104 which rotates the drive roll 94 to pull the material 10 through the welding station 34.

A score slitting assembly 36 may be optionally placed between the ultrasonic welders and the drive roll. The score slitting assembly 36 comprises a frame, which stretches across the width of the machine, and has score slitters with round blades. Air pressure forces the round blades in a downward direction. Beneath the material is a score slitting roller. The score slitters may be placed at any location along the width of the machine so that as the material 10 passes through the score slitting assembly 36, the material 10 is slit to a desired width. The material 10 may be slit or not slit, depending upon whether the score slitters are activated by pressurized air from a main air supply 68. The score slitting assembly 36 can itself be physically removed from the machine.

The anvil 86, drive roll 94, and score slitting roller are all connected to the same motor 104 by a sprocket and chain assembly 102 and adjusted so that they have the same surface speed, and therefore they uniformly pull the material 10 through the welding station 34.

After the material passes through the welding station 34, it can be either rewound by a rewinder 38 or cut to any desired length by a guillotine assembly (not shown). The rewinder 38 is capable of rewinding material up to 90 inches in diameter without significant telescoping of the rewound roll 112.

For rewinding, after the material 10 passes through the welding station 34 it is fed under a floating dancer roll 106. The floating dancer roll 106 is able to move, or float, in an up and down direction with the roll 106 always being parallel to the shaft of the rewind roll 112. Air cylinders 108 press the floating dancer in a downwardly direction, thus putting tension on the web of material 10 as it is rewound. The material then passes over a stationary idler roll 110, and then is rewound on the rewind roll 112. A diameter sensor 116 monitors the diameter of the rewind roll 112. When the machine is off, the diameter sensor 116 falls downward away from the rewind roll 112 for loading and unloading of the roll 112. When the machine is turned on, an air cylinder 118 presses the diameter sensor 116 up against the rewind roll 112. The rewind roll 112 is also motor driven 114.

The material 10 is rewound more satisfactorily when web tension is relatively higher, and therefore packing of the rewind roll 112 is relatively tighter, at the beginning of the rewind operation, than at the end. When the rewind roll 112 is getting started, the diameter sensor 116 senses that the diameter of the rewind roll 112 is relatively small, and an air regulator attached to the diameter sensor 116 diverts a relatively high air pressure to the cylinders 108 forcing the floating dancer 106 down on the web 10, thus putting relatively high tension on the web as it is rewound. As the diameter of the rewind roll 112 grows, which is continually monitored by the diameter sensor 116, the pressure to the air cylinders 108 is reduced. In this particular embodiment, the air pressure to the cylinders 108 for the floating dancer starts at 60 psi and is gradually reduced down to zero at or near the full diameter of the rewind roll 112.

A potentiometer 115 for controlling the rewind motor 114 is connected to the floating dancer 106 to monitor the position of the dancer 106 and monitor slack in the rewind operation. When too much slack builds up, the floating dancer 106 tends to move toward the extreme downward position, in which case the potentiometer 115 causes the motor 114 to speed up and take the slack out. When the web 10 is too tight, the floating dancer 106 tends to move toward the extreme upward position, in which case the potentiometer causes the rewind motor 114 to reduce speed and put a little more slack in the rewind operation. The rewind motor 114 is also direct current, and is rated at 2 hp, 180 volts, 9.6 amps and 1750 rpms, and is also available from Baldor Electric.

Therefore, by monitoring the diameter of the rewind roll 112 to control the air pressure to the floating dancer 106, 108, and by monitoring the position of the floating dander 106 to control the speed of the rewind motor 114, the proper tension and packing of the web 10 is controlled throughout the rewind operation.

Figure 11:
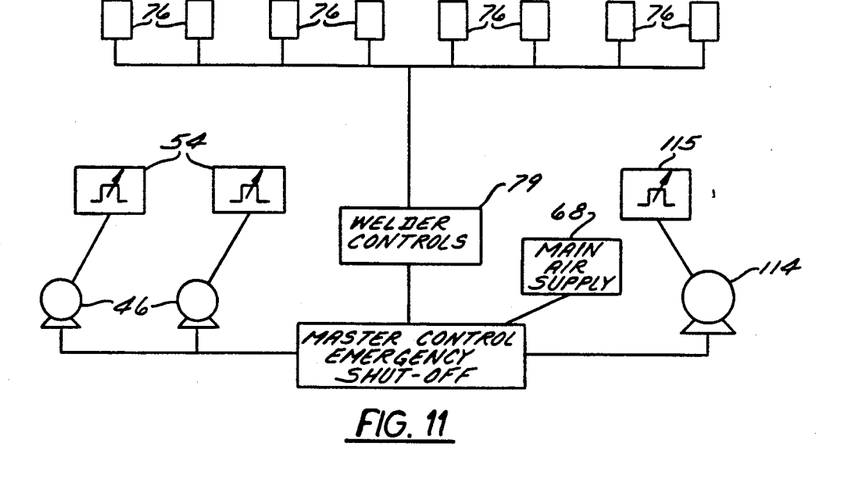
FIG. 11 is a diagram of the electrical control systems.
Figure 12:
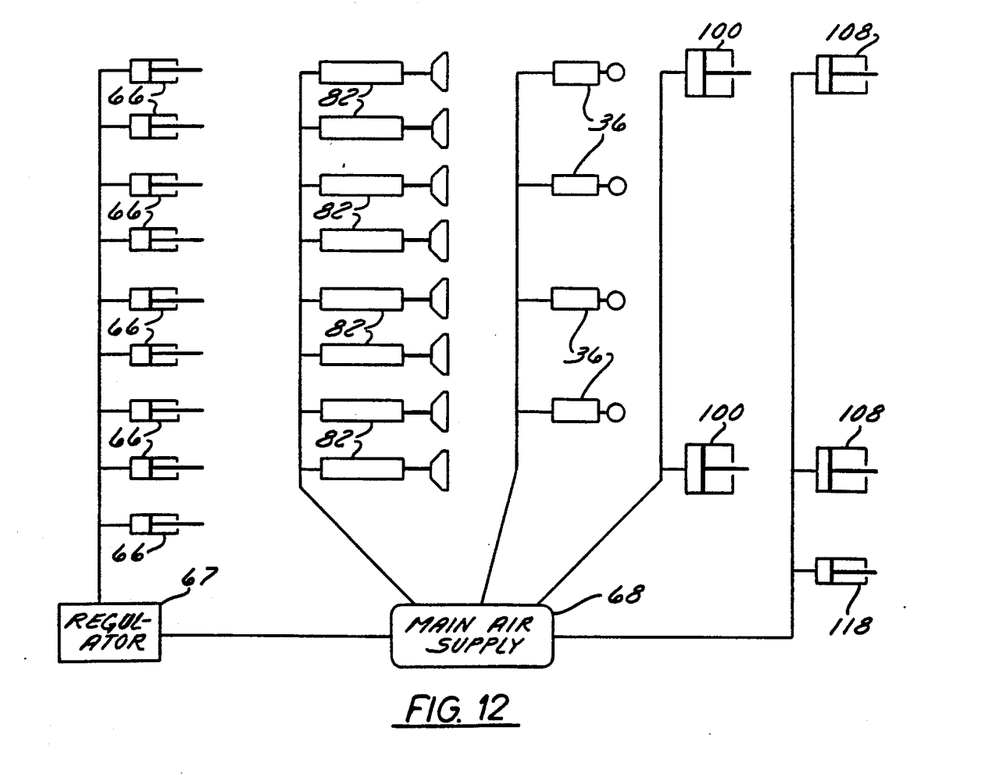
FIG. 12 is a diagram of the pressurized air system.

The electrical control system, as shown in FIG. 11, provides for a main switch to activate the machine and provides for an emergency shut-off in case any of the electrical components are not working properly. Pressurized air from a main air tank 68 on the machine is fed to air cylinders for the tension arms 66, for the ultrasonic welders 82, for the scoring slitters 36, for the drive/nip roll 100, for the floating dancer 108, and for the diameter sensor of the rewind roll 118, as shown in FIG. 12. In addition, a separate air line (not shown in FIG. 12) from the plant air supply cools the interface between the actuators 78 and horns 84 of the ultrasonic welders 86. Also, another separate air line (not shown in FIG. 12) from the plant air supply, and which is passed through a refrigerated dryer, cools the ultrasonic welders 86.

The specific embodiment described above has been successfully used to manufacture sheets from melt blown polypropylene, although the invention is intended to be usable for a wide range of thermoplastics used in manufacturing webs or thin sheets of nonwoven fibers. Also, it is understood that the specific dimensions referred to above are not critical to the practice of the invention.

We claim:

1. An apparatus for converting full width rolls and scrap rolls of thermoplastic fiber material into a layered sheet of said material comprising:

a first feed reel for unwinding a first full width roll of thermoplastic fiber material into a first layer;

a second feed reel for unwinding a second full width roll of thermoplastic fiber material into a second layer;

a motor on each of the first and second feed reels to drive rotation of the full width roll thereon, and a dancer assembly responsive to the amount of tension in the layer of material for controlling the speed of the motor;

a third feed reel for unwinding a plurality of scrap rolls of thermoplastic fiber material into a third layer, each said scrap roll having a width substantially less than the width of either of said first and second full width rolls, and said plurality of scrap rolls arranged side-by-side on a single shaft in coaxial adjacent relationship to each other so that said plurality of scrap rolls have a combined width approximately equal to each of said first and second full width rolls and said third feed reel further comprising means for independently rotating each scrap roll and means for slightly retarding rotation of each scrap roll to prevent slack in the strips of material unwound therefrom;

a tracking section for maintaining and aligning strips of material unwound from the scrap rolls in parallel edge-to-edge relationship and for bringing said third layer into substantially flatwise parallel relationship between said first and second layers;

an ultrasonic station for ultrasonically bonding said first, second and third layers together into said layered sheet;

a drive assembly for pulling the layers of material through the ultrasonic station; and a rewind station for rewinding said layered sheet into a rewind roll.

2. The apparatus according to claim 1 wherein the dancer assembly further comprises a pivot arm connected to one side of the respective feed reel, a second pivot arm connected to the other side of the feed reel, a shaft between the two pivot arms with the layer of thermoplastic fiber material from the corresponding full width roll being feedable across the shaft, and a potentiometer connected to the pivot arm for adjusting the unwind speed of the motor on the feed reel in response to change in tension in the respective layer of material.

3. The apparatus according to claim 1, further comprising a disc spacer between each pair of scrap rolls.

4. The apparatus according to claim 1, wherein the means for slightly retarding rotation comprises an independent tension arm assembly for each scrap roll.

5. The apparatus according to claim 4, wherein each tension arm assembly comprises a tension arm pivotable onto and away from its corresponding scrap roll, a roller on the tension arm freely rotatable against the scrap roll, and an ari cylinder for pivoting the tension arm.

6. The apparatus according to claim 1, wherein the tracking section further comprises a horizontal planer tracking surface and a linear tracking spacer between each pair of strips.

7. The apparatus according to claim 1, wherein the ultrasonic station further comprises a plurality of ultrasonic welders supported on a frame over the layers of material, with each ultrasonic welder having a horn extendible downward on top of the layers of material, and a rotatable anvil beneath the layers and aligned directly underneath the horns.

8. The apparatus according to claim 7, wherein the horn is slightly deflectable upward and downward as the layers of material pass thereby.

9. The apparatus according to claim 1, wherein the rewind station further comprises a rewind motor for driving a shaft on which the layered sheet is rewound, a floating dancer pressable downward onto the layered sheet for controlling the speed of the rewind motor, and a diameter sensor for monitoring the diameter of the rewind roll and for controlling the floating dancer.

* * * * *